United States Patent Office 2,693,855

Patented Nov. 9, 1954

2,693,855

SIMULTANEOUS ACIDIZING OF SANDSTONE OIL WELLS AND SEALING OFF BOTTOM WATER

Donald C. Bond, Crystal Lake, Ill., assignor to The Pure Oil Company, Chicago, Ill., a corporation of Ohio No Drawing. Application November 28, 1950, Serial No. 198,029

7 Claims. (Cl. 166—29)

This invention relates to a well completion procedure. More specifically, it provides a method for the concurrent acidization of subterranean oil producing formations traversed by a drill hole and the exclusion of water flowing from water producing formations adjacent to said oil producing formation.

In the development of oil fields subsequent to drilling but prior to the actual commercial production of the crude oil there is a phase of operations called well completion. This intermediate practice entails the solution of various problems which must be overcome before the crude oil can be produced in rates sufficient to justify the cost of producing operations. The problems encountered in well completion include among others the exclusion of water from the well bore and the acidization of the crude oil producing formations to increase the production capacity. This invention is concerned with a simultaneous method of water exclusion and acidization of adjacent geological strata.

In general, the exclusion of water from the well bore in well completion operations is concerned with water that is produced from formations which are adjacent to the oil producing formation. Water producing formations which are immediately adjacent or contiguous to the oil producing formation as well as those which are in close proximity require treatment to prevent the flow of water therefrom. Quite frequently in drilling operations the producing stratum is transversed and a subjacent water bearing formation penetrated. This penetration results in the admission of water to the drililng hole. The presence of this bottom water as it is called as well as the presence of water from other water producing formations in the well gives rise to attendant disadvantages such as the increased cost of pumping and the necessity for resolving the water-in-oil emulsions which form when the oil is pumped from within the well. Where high pressure sources of water are encountered drastic steps must be taken to combat the entrance of the water into the bore hole. However, where the water is produced from a relatively permeable and porous formation various materials may be forced into the pores or interstices in such a manner as to provide a plug for this water producing formation thereby excluding the water from the bore hole.

Relative to the acidization aspect of this invention it is a well known expedient in the prior art to introduce acid into a bore hole in such a manner that it is placed opposite a subterranean fluid producing formation. This acid is forced into the formation and reacts therewith to increase the porosity and the permeability of the productive stratum thereby permitting the fluid contained therein to flow more readily into the bore hole from whence it naturally flows or is pumped to the surface. This procedure has been variously employed in increasing the production of water, oil, or gas from subterranean reservoirs. In its adaption to oil-well methods consideration must be given to the composition of the formation which is to be acid treated. These oil producing formations generally consist of either limestone or dolomite reservoirs in which instance a hydrochloric acid solution is used as a treating solution or siliceous formations in which an acid is used which will dissolve the silica-containing constituents of the formation thereby producing the desired results. It is with the treatment of this latter type of formation that my invention is concerned. In acidizing these siliceous formations the prior art has taught the use of such acids as hydrofluoric, fluoboric as well as other hydrogen fluoride containing acids which are used per se or prepared in situ in the formation. A recent development in the acidization of the siliceous formations has been the utilization of fluophosphoric acids. These acids which may be used in the mono, di or hexa form are equally as effective as hydrofluoric acid yet in the anhydrous form do not have any of the disadvantageous properties relating to the physiological effect on human skin tissue that is inherent in hydrofluoric acid or its solutions.

When acidizing oil wells in well completion operations the introduction of the acid into water producing formations is generally avoided as the acid treatment would increase the water production. I have found that this disadvantageous result can be eliminated when acidizing sandstone formations. Accordingly, it is an object of this invention to effect a single step operation which brings about the simultaneous solution of two problems normally encountered in well completion operations. It is a further object of this invention to provide a method whereby a siliceous oil producing formation is acidized to increase the producing capacity thereof and simultaneously effecting the exclusion of water produced from a relatively loose, adjacent, siliceous water producing formation.

In addition, it is a further object of this invention to employ the sealing concept of the invention apart from the acidizing feature as a means for selectively sealing siliceous formations.

I have found that when an aqueous solution of a fluophosphoric acid reacts with a siliceous formation there is produced a fluosilicic acid. This acid is termed a spent acid inasmuch as it has no reactivity toward the silica constituents of the formation. However, the spent acid will react with solutions of sodium salts to form a precipitate of slightly soluble sodium fluosilicate. In carrying out the process of my invention I am able to seal off water produced from water horizons adjacent to oil producing formations as well as acid treat the oil producing formation to increase its permeability by the simultaneous injection of a fluophosphoric acid into the adjacent formations. In the oil producing formation which is substantially free from the presence of sodium salts the fluophosphoric acid which is introduced into the formation functions to dissolve the silica thereby increasing the oil productive capacity of the formation. The fluosilicic acid thus formed is flushed out of the formation with the initial flow of oil. The acid introduced into the water producing formation likewise reacts with the siliceous formation to produce fluosilicic acid. This spent acid instead of being removed from the formation is retained therein and reacts with the sodium salts contained in the formation water to form insoluble precipitates which serve to plug and effectively seal off the pores and interstices of the water producing formation.

Inasmuch as the formation water associated with oil is derived from sea water originally in the sand, sandstones or shales when they were formed, i. e., connate water, rain and snow water which enter the rocks where they are exposed at the outcrop or work down into the lower strata dissolving salts from them, i. e., meteoric water, these connate or meteoric waters will inherently contain a sufficient quantity of sodium salts to produce the desired effect. However, if insufficient concentrations of sodium salts are present desired concentration may be obtained by introducing sodium chloride solutions into the water zone prior to acidizing.

In the event that there is the undesirable concomitant occurrence of aqueous solutions of sodium salts and oil in the oil producing zone the objects of this invention may be carried out by a treating method whereby the oil producing formation is initially sealed off from the water producing formation by means of a suitable packing device. The oil producing formation is then flushed with a water or other suitable fluid to remove any sodium salts or their solutions from the area to be treated. The packing device is then removed and an aqueous solution of fluophosphoric acid is then injected into the well and into the respective formations in such a manner as to contact not only the flushed oil producing formation but the adjacent water producing formation as well. The aqueous solution of a fluophosphoric acid introduced into the oil producing formation functions to acidize the oil producing formation therefore increasing its productive capacity while at the same time the fluophosphoric acid introduced into the water producing formation reacts with the siliceous constituents contained therein thus forming fluosilicic acids. These acids subsequently react with the sodium salts contained in the formation water to form insoluble sodium fluosilicates which will seal the sand against the formation of water into the well. In either instance an effective shutoff of formation water will be obtained simultaneously with the acidization of these adjacent silica containing formations with fluophosphoric acids. While this invention has application in the acid treatment of adjacent oil producing formations and water producing formations it is more readily adaptable to treating bottom water producing formations which are imediately subjacent to the oil productive stratum because it is unnecessary to provide an elaborate packing system to effect the desired result. It is also within the scope of this invention to utilize the method of sealing siliceous formations as taught by my invention as a single step operation and not in conjunction with the acid treatment to decrease the permeability of a siliceous formation.

The fluophosphoric acids used in the instant invention are commercially available and may be obtained in the form of mono, di or hexa acid or mixtures thereof. I have found that the most effective acidization is accomplished when aqueous solutions of these acids containing about 50 per cent by weight of the fluophosphoric acid is employed. Furthermore, I have found that the difluophosphoric acid is more efficacious than the other forms of fluophosphoric acids or their mixtures. Therefore, to provide the most desirable results it is preferred that aqueous solutions containing about 50 per cent by weight of these acids be employed in this invention because this concentration is most reactive toward silica. Regarding the use of the same solution to react with the silica in the water producing formation the water present in the water producing formation will function to further dilute the aqueous acid solutions used thereby decreasing its reactivity towards silica. This result however is not disadvantageous inasmuch as I have found that aqueous solutions of fluophosphoric acids will react with silica at all concentrations.

Although an uninhibited fluophosphoric acid may be used the corrosion which results from the use of this uninhibited acid makes it necessary that when the technique described by this invention is carried out with equipment constructed from ferrous metals it is necessary to inhibit the fluophosphoric acid to prevent the corrosion of the surface lines injection pumps and oil well tubing during acidization. I have found that the addition of small amounts of arsenous oxide to the aqueous solutions of fluophosphoric acids reduces the corrosion rate of these fluophosphoric acids so that they may be effectively employed for the purpose described in this invention.

Any well acidizing technique described in the prior art may be utilized in carrying out my invention. The methods taught by Carr in United States Patents 1,891,667 and 2,018,199 are examples of suitable procedures which may be used in treating adjacent water producing and oil producing formations which occur in contiguous relation at the bottom of the drill hole. Where the formations to be treated are at intermediate levels, packers may be utilized to isolate the zones in order to control the acid injection at a predetermined section. The amount of acid used will of necessity vary for each treating situation encountered. However, quantities of the acid between 1,000 and 10,000 gallons of acid may be employed and if necessary a subsequent acid treatment may be employed.

It is therefore seen that I have found a method for overcoming several of the problems encountered in well completion and that by carrying out my invention it is possible to effect simultaneously the acidizing of silica-containing oil producing formations to enhance their productive capacity and exclusion of formation water from adjacent silica-containing water producing formations by using a single injection of a suitable concentration of a fluophosphoric acid.

I claim:

1. In the simultaneous acid treating of oil producing siliceous formations and water producing siliceous formations substantially free from oil adjacent thereto, said formations being traversed by a bore hole and containing water soluble salts selected from the group consisting of alkali and alkaline earth metal salts the steps comprising temporarily isolating the oil producing formations and water producing formations each from the other with a packing device, flushing said oil producing formation substantially free from said metal salts with a flushing medium, removing said packing device, introducing a charge of an aqueous solution of a fluophosphoric acid into said bore hole and forcing a portion of said aqueous solution into said water producing formation and forcing the remaining portion of said charge into said oil producing formation, the amount of said aqueous solution introduced into said oil producing formation being sufficient to react therewith and increase the permeability of the formation and the amount of said aqueous solution introduced into said water producing formation being sufficient to react therewith in the presence of said metal salts to form water insoluble precipitates in an amount sufficient to substantially decrease the water producing capacity of said water producing formation.

2. A method in accordance with claim 1 in which the said fluophosphoric acid is monofluophosphoric acid.

3. A method in accordance with claim 1 in which the said fluophosphoric acid is difluophosphoric acid.

4. A method in accordance with claim 1 in which the said fluophosphoric acid is hexafluophosphoric acid.

5. A method in accordance with claim 1 in which the said fluophosphoric acid is a mixture of acids selected from the group consisting of mono-, di-, and hexafluophosphoric acids.

6. A method in accordance with claim 1 in which the said aqueous solution of fluophosphoric acid contains about 50 per cent by weight of difluophosphoric acid.

7. In an oil well completion method a process for increasing the productive capacity of an oil producing siliceous formation and concurrently therewith preventing the intrusion of water into the bore hole from a water producing siliceous formation substantially free from oil adjacent to said oil producing formation which comprises isolating the formations from each other by means of a bore hole packer device, introducing into the bore hole a charge of an aqueous solution of fluophosphoric acid, diverting a portion of said charge into the water producing formation to react therewith in the presence of water soluble sodium salts, forcing the remaining portion of said charge into said oil producing formation, the amount of said charge being introduced into said oil producing formation being sufficient to react therewith to increase the permeability of the formation and the portion of said charge introduced into said water producing formation being sufficient to react therewith in the presence of said sodium salts and form water insoluble precipitates in an amount sufficient to plug effectively the said water producing formation.

References Cited in the file of this patent

UNITED STATES PATENTS

| Number | Name | Date |
|---|---|---|
| 1,891,667 | Carr | Dec. 20, 1932 |
| 1,990,969 | Wilson | Feb. 12, 1935 |
| 2,018,199 | Carr et al. | Oct. 22, 1935 |
| 2,128,161 | Morgan | Aug. 23, 1938 |
| 2,200,710 | Bent et al. | May 14, 1940 |
| 2,267,855 | Chamberlain | Dec. 30, 1941 |
| 2,300,393 | Ayers | Nov. 3, 1942 |
| 2,367,350 | Heigh | Jan. 16, 1945 |
| 2,408,785 | Lange | Oct. 8, 1946 |
| 2,423,895 | Lange | July 15, 1947 |
| 2,488,298 | Lange et al. | Nov. 15, 1949 |

OTHER REFERENCES

Technical Service Bulletin FPA-1, Monofluophosphoric Acid Difluorophosphoric Acid, 9 pages, published 1944 by Ozark Chemical Co., Tulsa, Okla. (Copy in Div. 59, 23—139.)